(12) United States Patent
Reid et al.

(10) Patent No.: US 6,195,167 B1
(45) Date of Patent: Feb. 27, 2001

(54) AUTOCORRELATION OF ULTRASHORT ELECTROMAGNETIC PULSES

(75) Inventors: Derryck Telford Reid; William Ernest Donald Sleat; Wilson Sibbett, all of Fife (GB)

(73) Assignee: The University Court of the University of St. Andrews, St. Andrews (GB)

(*) Notice: Subject to any disclaimer, the term of this patent is extended or adjusted under 35 U.S.C. 154(b) by 0 days.

(21) Appl. No.: 09/129,726

(22) Filed: Aug. 5, 1998

Related U.S. Application Data

(60) Provisional application No. 60/056,151, filed on Aug. 19, 1997.

(51) Int. Cl.$^7$ ..................................................... G01B 9/02
(52) U.S. Cl. ............................................................ 356/450
(58) Field of Search ............................................. 356/345

(56) References Cited

U.S. PATENT DOCUMENTS 5,299,170 * 3/1994 Shibata et al. .................... 356/345

OTHER PUBLICATIONS

Ippen et al, Dynamic Spectroscopy and Subpicosecond Pulse Compression, Applied Physics Letters—p. 488–490, Nov. 1975.*

* cited by examiner

Primary Examiner—Robert Kim
(74) Attorney, Agent, or Firm—Lee, Mann, Smith, McWilliams, Sweeney & Ohlson

(57) ABSTRACT

There is provided an autocorrelator of ultrashort electromagnetic pulses, comprising an interferometer for receiving a parent electromagnetic pulse from an energy source and for deriving two daughter electromagnetic pulses from the parent pulse, an output means coupled to the interferometer to output the daughter pulses, and a photodiode in communication with the output means to detect the daughter pulses and to alter the frequency thereof so as to produce an electrical output signal that has a quadratic dependence on the power associated with the parent electromagnetic pulse. The temporal duration of the pulses ranges from T0 picoseconds to 5 femtoseconds. A GaAsP photodiode is used with a broad band response of 700–1300 nm. The interferometer is either a Michelson interferometer or a Wollaston prism interferometer and a microscope objective is provided between the output means and the photodiode so that the pulses from the output means are focused onto a defined area of the photodiode.

10 Claims, 4 Drawing Sheets

AUTOCORRELATION OF ULTRASHORT ELECTROMAGNETIC PULSES

RELATED APPLICATIONS

This application claims the benefit of U. S. Provisional Application Ser. No. 60/056,151, filed Aug. 19, 1997.

This invention relates to the autocorrelation of ultrashort electromagnetic pulses, such as pulses obtained from mode-locked lasers, and in particular to the autocorrelation of pulses with a duration of 1 picosecond to 5 femtoseconds.

BACKGROUND TO THE INVENTION

The durations of pulses produced from mode-locked lasers can be as short as a few femtoseconds (1 fs=$10^{-15}$ s) and typically have durations of less than 100 fs. The response times of the fastest electronic circuits are thousands of times longer than the duration of these pulses and therefore electronic techniques cannot be used to directly measure pulse durations. The shortest event available for measurement purposes is the pulse itself and this is the basis of optical autocorrelation techniques used for ultrashort pulse measurement.

In the most common autocorrelator arrangement, an input pulse, or parent pulse, passes into a Michelson interferometer which splits the parent pulse into two daughter pulses which are identical in shape and amplitude. The two daughter pulses travel along separate paths in the interferometer, one path being of variable length by use of a reflecting arm with a variable position. The two daughter pulses exit the interferometer overlapped spatially but with a relative temporal delay equivalent to the difference in path lengths travelled by each of the identical daughter pulses.

A two-wave mixing process, such as second-harmonic generation, is then used to obtain a mixing signal between the two daughter pulses. When the path lengths travelled by each daughter pulse are equal, the relative delay between the daughter pulses is zero and the mixing signal is strongest. As the difference in path length of the two daughter pulses increases, the product of the mixing decreases until, for time delays which are a few times longer than the pulse duration, the mixing signal becomes zero or at least insignificant. Therefore by studying how the mixing signal varies in response to changes in path length, a correlation signal can be obtained where width is related to the width, (i.e. duration), of the original input pulse.

Second-order autocorrelation, where the mixing signal varies quadratically with the optical input power, is common in mode-locked laser oscillators, and second-harmonic generation (SHG) has been used successfully to produce high-quality autocorrelation of sub-picosecond duration pulses. In SHG autocorrelation, the fields from each daughter pulse are coupled by a second-harmonic generation process to produce a wave at twice the fundamental frequency. The wave amplitude $E_2$ is defined by:

$$E_2 = E_{1a} \times E_{1b} \qquad (1)$$

where $E_{1a}$ is the amplitude of a first daughter pulse, $E_{1b}$ is the amplitude of a second daughter pulse, and where both daughter pulses are directly derived from the same input parent pulse.

The second-harmonic intensity therefore varies quadratically with the input power to the Michelson interferometer. In practice, the further pulses which exit the Michelson interferometer are focused into a frequency-doubling crystal and the frequency-doubled light is then detected using a photomultiplier tube. The output voltage from the photomultiplier tube is then recorded as a function of the path difference between the pulses, or equivalently displacement of one of the interferometer arms, to give the autocorrelation signal of the input pulse.

SUMMARY OF THE INVENTION

In accordance with the present invention, there is provided an autocorrelator of ultrashort electromagnetic pulses, comprising an interferometer for receiving a parent electromagnetic pulse and for deriving two daughter electromagnetic pulses from the parent pulse; an output means coupled to the interferometer to output the daughter pulses; and diode means in communication with the output means to detect the daughter pulses and alter the frequency thereof, so as to produce an electrical output signal which has a quadratic dependence on the power associated with the parent electromagnetic pulse. Thus typically the alteration in frequency is a frequency doubling so that the quadratic power dependence of the electrical output signal on the input power is achieved.

The ultrashort electromagnetic pulses may have a temporal duration ranging from picoseconds ($10^{-12}$ s) to femtoseconds ($10^{-15}$ s). Thus the range of pulse durations for which the present invention is intended to be used is over the range 10 picoseconds to 5 femtoseconds, and more preferably from 1 picosecond to 5 femtoseconds, and most preferably from 100 femtoseconds to 10 femtoseconds. A defined pulse width is required for the diode means to produce the required quadratic response and therefore there is an upper limit on the duration of the pulses, beyond which significant quadratic power response is not achieved.

The diode means preferably provides the quadratic power response for pulses with wavelengths of certain energies. Therefore where the diode means has an energy bandgap of energy $E_g$, the quadratic response is provided for pulse wavelengths of photon energy less than $E_g$ but greater than $E_g/2$.

The diode means may be a semi-conductor device such as a light emitting diode (LED), a photodiode or a laser diode and others that will become apparent to one skilled in the art. Suitable semi-conductor materials are GaAsP, AlGaAs, InGaAs, Ge, and GaAs, which operate as photovoltaic detectors and therefore require no external electrical bias. Use of diodes ensures a broad band response which can range from 780–4000 nm. For example, ranges achieved for GaAsP are 700–1300 nm, AlGaAs are 680–1300 nm, for GaAs 1000–2000 nm (1–2 micron), for a Ge photodiode 1800–3600 nm; and for InGaAs 2–4.9 microns. The bandwidth of the photodiode $\Delta\lambda = hc/E_g$ and extends to wavelengths approaching $E_g/2$. This allows measurement over a large wavelength range without realignment.

The interferometer may be a Michelson interferometer, or the interferometer may instead be a Wollaston prism interferometer. The Wollaston prism interferometer is of particular advantage as it has an optical path that follows one direction only. Furthermore, no reflecting surfaces are required in a Wollaston prism interferometer which reduces energy losses within the autocorrelator.

Preferably a focusing element is provided between the output means and the diode means so that the pulses from the output means are focused onto a defined area of the diode means.

In accordance with another aspect of the invention, there is also provided a method of SHG autocorrelation for ultrashort electromagnetic pulses, the method comprising deriving two daughter electromagnetic pulses from a parent electromagnetic pulse by use of an interferometer, passing the daughter pulses to a diode means with an energy gap of $E_g$, detecting in the diode means daughter pulses of photon energy less than $E_g$ but greater than $E_g/2$, and producing an output electrical signal from the diode means which depends quadratically on the incident power associated with the parent electromagnetic pulse.

The use of a diode means in an autocorrelator provides a solid state device with particular advantages over the prior art use of a photomultiplier tube and frequency-doubling crystal. In particular as semi-conductor diodes are relatively cheap and small devices, their use in an autocorrelator provides a particularly compact apparatus. Also diodes are more robust than photomultiplier tubes as they do not need a high voltage supply or a vacuum to operate. Further the photovoltaic nature of diodes is of advantage as they will generate their own electrical current and do not need to be connected to a power supply.

Disadvantages experienced with the prior art use of crystals are avoided. In particular a photodiode is polarisation insensitive, and is broadband so that for broadband laser pulses, i.e. a short pulse with a large frequency range, the diode has the same response over the entire pulse. This is unlike crystals where movement of the crystal is required to detect over the full range.

Preferred embodiments of the invention will now be described by way of example, and with reference to the accompanying drawings in which.

DESCRIPTION

Figure 1:
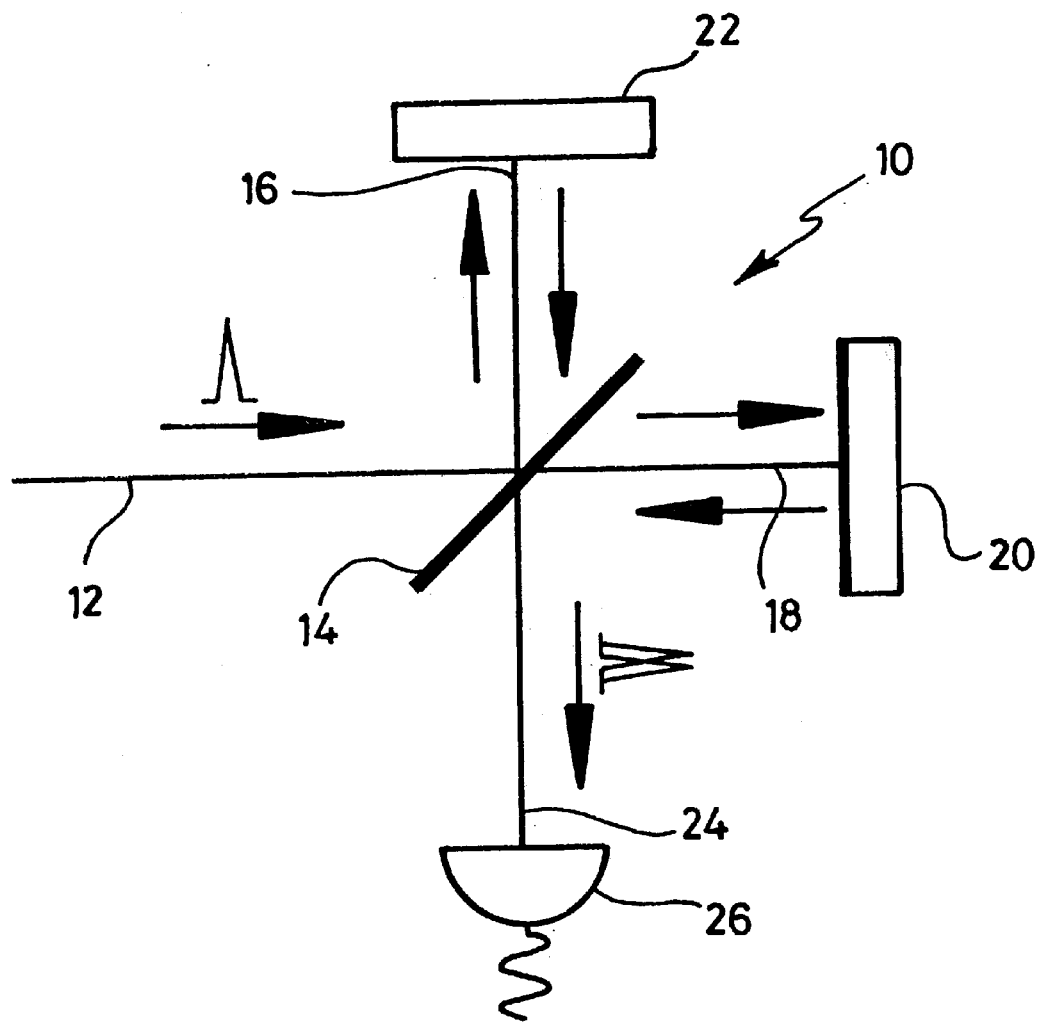
FIG. 1 shows a schematic view of a prior art autocorrelator comprising a Michelson interferometer and a detector apparatus.

In the most common prior art autocorrelator arrangement as shown in FIG. 1, an input pulse, or parent pulse, from an energy source is sent into a Michelson interferometer 10 along path 12.

The interferometer 10 contains a beam splitter 14 which splits the parent pulse into two identical daughter pulses. The daughter pulses pass along separate paths 16, 18 and are deflected off arms, or mirrors, 20 and 22. One arm is fixed and is called the static arm, the other arm is moveable and is known as the scanning arm. The daughter pulse passing along path 16 returns through the beam splitter 14 without being further deflected, whilst the daughter pulse travelling along path 18 is deflected by the beam splitter 14, so that both daughter pulses leave the interferometer 10 along a common path 24. However as the scanning arm is moved it introduces, and varies, a path difference between the separate paths travelled by the two daughter pulses. Thus the daughter pulses exit the interferometer 10 overlapped spatially but with a relative temporal delay equivalent to the difference in the lengths of paths 16 and 18.

As the daughter pulses leave the interferometer 10, a detector apparatus 26, comprising a frequency-doubling crystal and a photomultiplier tube, receives the daughter pulses and carries out second-harmonic generation (SHG) to obtain a mixing signal between the two daughter pulses. The output voltage from the photomultiplier tube is then recorded as a function of the displacement of one of the interferometer arms, which is directly equivalent to the path difference between the two daughter pulses, so as to give the autocorrelation signal of the parent pulse.

Figure 2:
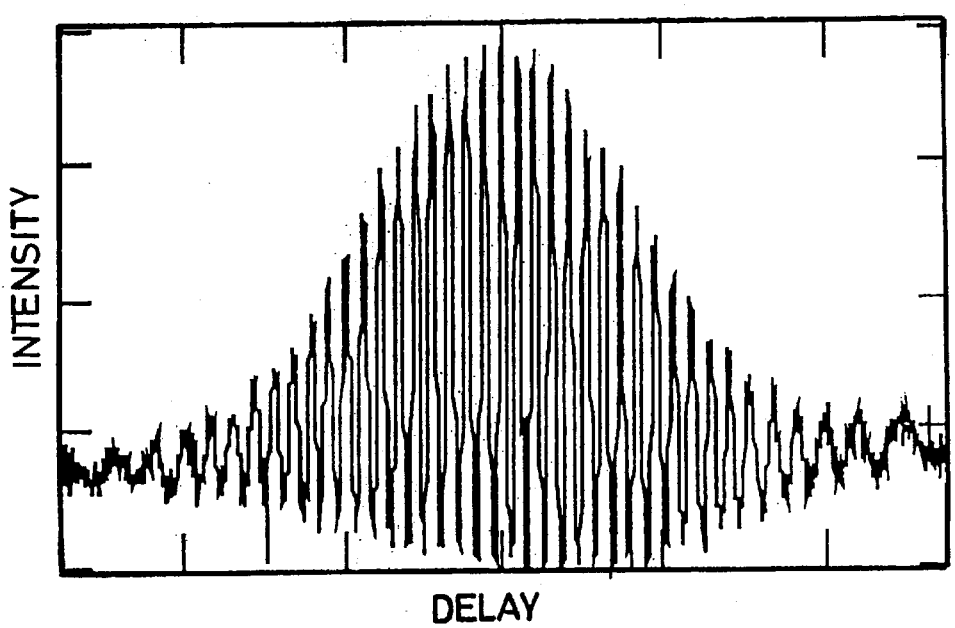
FIGS. 2 and 3 show different autocorrelation signals that are obtained depending on the response time of the detector apparatus, with FIG. 2 showing a fringe-resolved interferometric autocorrelation and FIG. 3 showing a time-averaged intensity autocorrelation.
Figure 3:
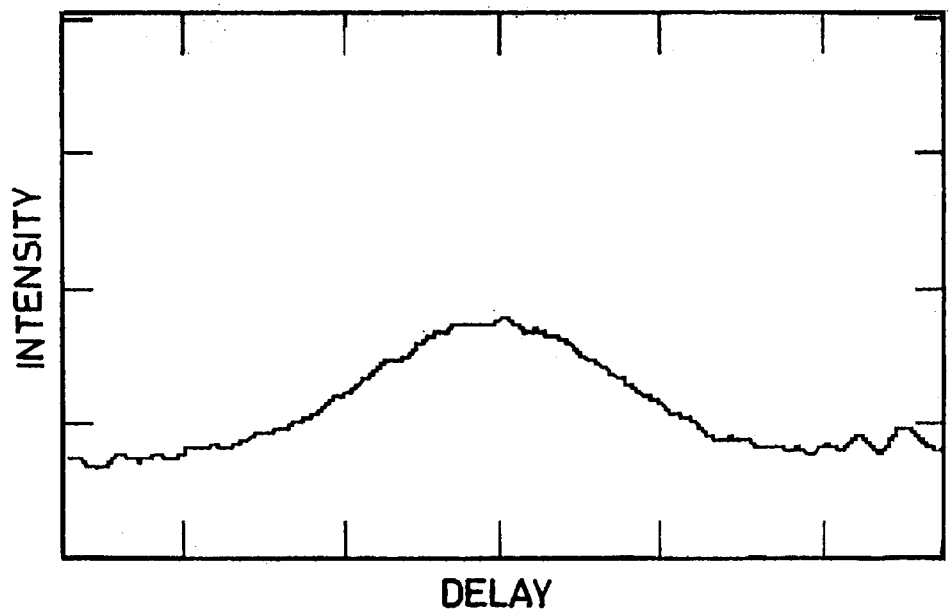

Two forms of autocorrelation signal can be recorded, depending on the time response of the detector apparatus 26. If the time response is fast in comparison to the rate at which the moveable interferometer arm scans a distance of one wavelength, then cosine fringes are recorded. The corresponding autocorrelation is known as a fringe-resolved interferometric autocorrelation, see FIG. 2. If the time-constant of the detector apparatus 26 is slow compared to the rate at which the interferometer arm is scanned, then no fringes are detected and the time-averaged intensity autocorrelation signal is recorded, see FIG. 3. In both FIGS. 2 and 3, intensity is plotted against delay, or path difference. The width of the autocorrelation signal is directly related to that of the input signal and as such the duration of the parent signal can be readily determined.

Figure 4:
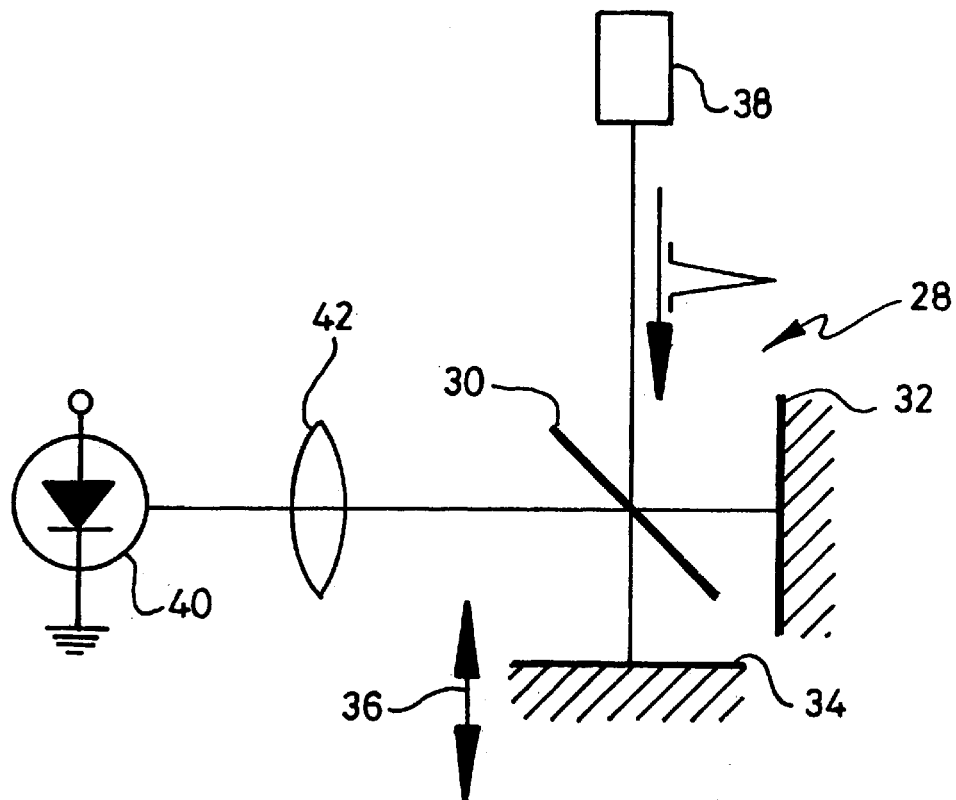
FIG. 4 shows a schematic view of a first embodiment of an autocorrelator in accordance with the present invention.
Figure 5:
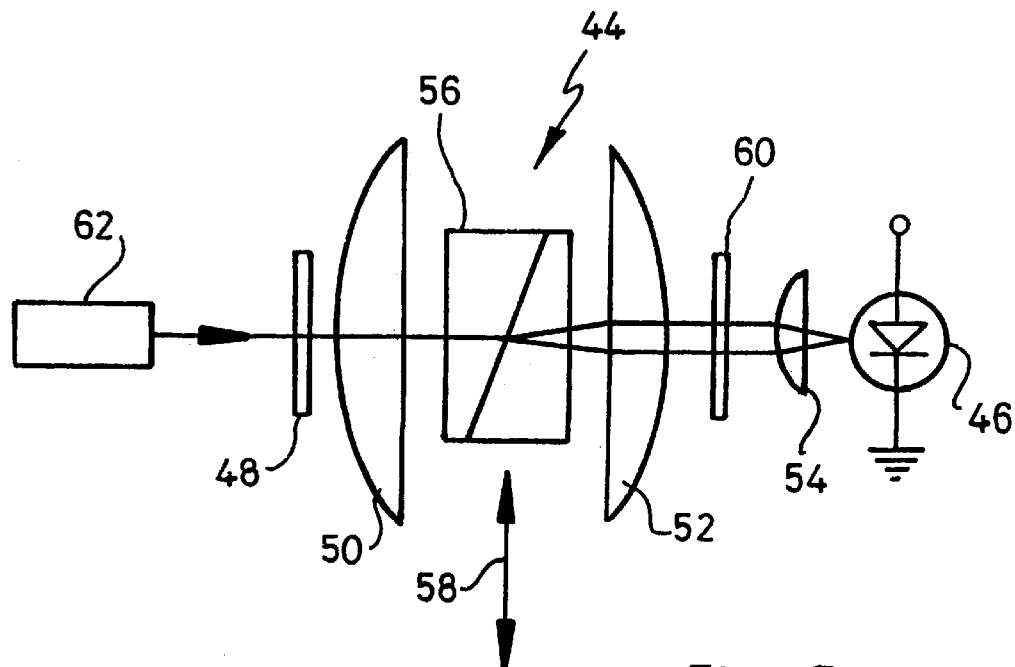
FIG. 5 shows a schematic view of a second embodiment of an autocorrelator in accordance with the invention.

FIGS. 4 and 5 show separately preferred autocorrelators which embody the present invention.

FIG. 4 shows an autocorrelator in accordance with the present invention, comprising a Michelson interferometer 28 and a diode means 40. The Michelson interferometer 28 comprises a beam splitter 30, a fixed reflective arm, or mirror, 32 and a moveable reflective arm, or mirror, 34 which is moveable along an axis denoted by arrow 36. Parent pulses of duration between 1 picosecond to 5 femtoseconds are supplied from a mode-locked laser 38, such as a Ti:sapphire laser operating at 800 nm. Such a mode-locked laser produces a train of individual pulses with a defined pulse width.

As the train of parent pulses enter the interferometer 28, a train of daughter pulses are produced as discussed in relation to FIG. 1. The daughter pulses leaving the interferometer are focused onto the diode means 40, by a focusing element 42, such as a microscope objective. The focusing element 42 is used to focus the daughter pulses onto the photodiode 40 as the diode presents a relatively small detection area.

The photodiode 40 is a GaAsP device, with a bandgap wavelength close to 650 nm. Other semi-conductor materials can be used to provide alternative diode means for use in the invention. Thus also suitable are an AlGaAs LED, GaAs LED, a Ge photodiode, an InGaAs photodiode, and an extended cut-off InGaAs photodiode and an InAs photodiode. Which diode means is preferred will depend on the diode wavelength response required for a particular source laser providing the parent pulse.

With a bandgap of $E_g$, the diode means is linearly sensitive to wavelengths with a photon energy greater than $E_g$, as for this energy single photon absorption occurs. This linear response region is the operating regime in which photodiodes are intended to be used. However for wavelengths with photon energies less than $E_g$, but greater than $E_g/2$, it has been advantageously, and surprisingly, discovered that certain photodiodes can operate in a two-photon absorption regime where under illumination with femtosecond and picosecond duration pulses, the output current produced from the diode means depends quadratically on the incident power associated with the parent pulse. Thus where the photon energy $E_p$ of the daughter pulses falls within the range $E_g > E_p > E_g/2$, the diode detects the incident daughter pulses, doubles the frequency of the pulses, and provides a quadratic power response over the original input power associated with the parent pulse. Thus as the path difference is varied by moving the scanning arm 34, the output electrical signal of the diode in response to the daughter pulses is a fringe-resolved interferometric autocorrelator, similar to that shown in FIG. 2.

Therefore a semi-conductor photodiode, or light emitting diode, used as a detector for ultrashort pulses, can be used to achieve the same functionality in an autocorrelator as in the prior art use of a frequency-doubling crystal followed by a photomultiplier tube. However a diode is sensitive across a wide spectral range giving a fairly uniform spectral response. This is different to the frequency-doubling crystals which have to be phase-matched over a spectral range.

FIG. 5 shows a further autocorrelator in accordance with the present invention in which a Wollaston prism is used to introduce relative delay between two orthogonal polarisation components, i.e. two daughter pulses, of a parent pulse. The autocorrelator comprises a Wollaston prism interferometer 44 and diode means 46. The Wollaston prism interferometer 44 further comprises a first polariser, or half-wave plate, 48, focusing lenses 50, 52, 54, a Wollaston prism 56 moveable along axis 58, and a second polariser 60. A mode-locked laser 62 provides a train of parent pulses of finite duration as discussed in relation to the embodiment shown in FIG. 4.

In FIG. 5, the Wollaston prism is made of quartz, although depending on the operating wavelength of the laser used, other materials may be more suitable, such as calcite or $MgF_2$. The quartz Wollaston prism 56 has a wedge angle of 26° and introduces a variable delay between the two daughter pulse trains, which can be further varied by adjusting the lateral position of the prism 56 along axis 58. The incident parent pulse train is polarised at 45° to the optic axes of the prism 56 by the first polariser 48, and this polarised beam is focused at the effective splitting plane of the prism 56. For fringe-resolved interferometric resolution, the delay introduced across the focused beam diameter must not exceed one-half wavelength of the incident light. Thus for a 800 nm laser source, a 40 $\mu$m spot size is required and is achieved by use of a 30 mm focal-length lens.

After the beam is split by the prism 56 into two trains of daughter pulses, the two orthogonally polarised trains of pulses experience a relative delay that varies by ±300 fs across the 20 mm prism aperture. On leaving the prism 56, the beams of daughter pulses are collimated by a 30 mm focal-length lens 52 and propagated along parallel paths separated by 250 $\mu$m. A second polariser 60 at 45° selects a common polarisation component, and a 15 mm focal-length microscope objective 54 images both beams to the same point on the diode 46 so as to recombine the daughter pulses interferometrically at the diode 46 to produce the quadratic power response as discussed above. As the Wollaston prism 56 is translated across the incident beam by an electromagnetic actuator, the resulting interferogram is acquired in synchronism with the prism motion, so as to produce a correlation signal similar to that shown in FIG. 2.

Figure 6:
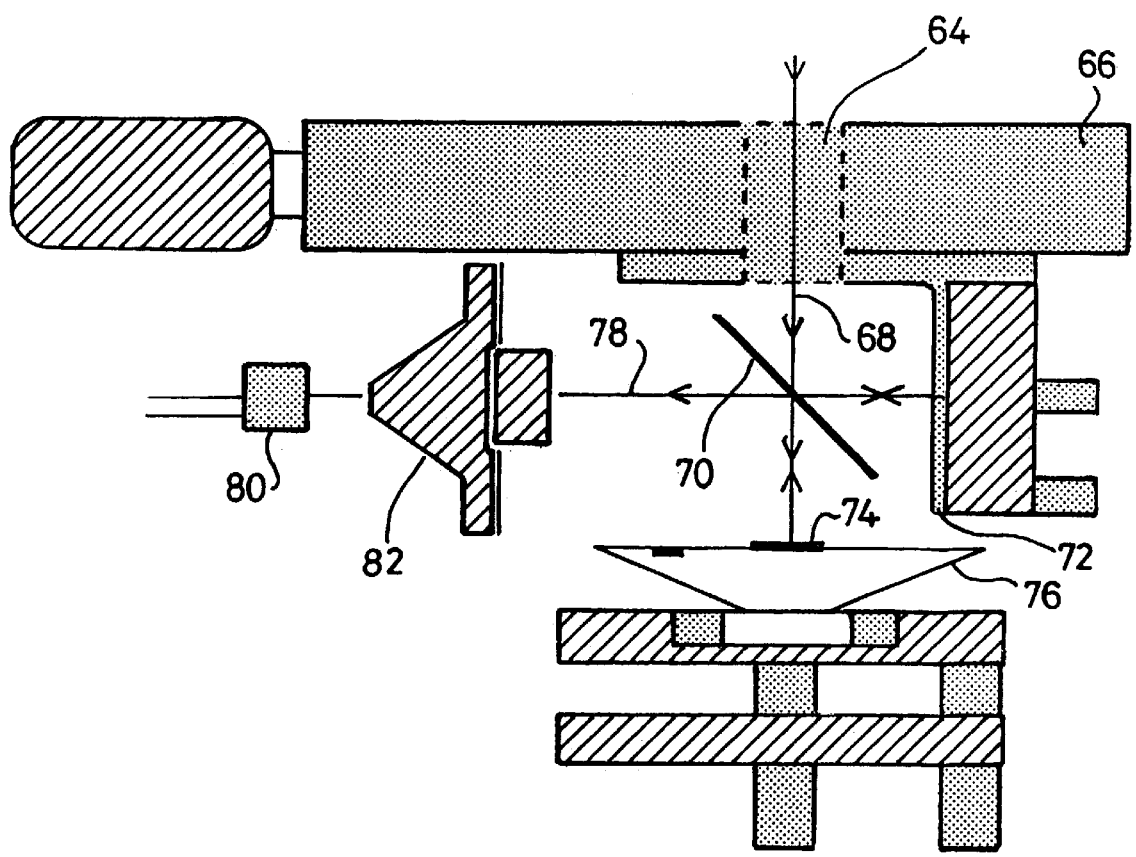
FIG. 6 shows a plan view of a preferred optical design of the first embodiment.

One optical layout of an autocorrelator as shown schematically in FIG. 4 is shown in FIG. 6. Pulsed laser light is received into the autocorrelator through an aperture 64 of a micrometer 66. The incident light travels along path 68 until it reaches a 50:50 beam splitter 70 comprising a custom dielectric coating centred at 800 nm and deposited on a 1 mm thick fused silica substrate. The beam splitter 70 splits the light containing the train of parent pulses into two trains of identical daughter pulses, with one train of daughter pulses being reflected off stationary mirror 72 and the second train of daughter pulses being reflected off mirror 74 which is mounted on a loudspeaker cone 76. Both mirrors are high reflectivity dielectric coatings optimised at 800 nm, and mirror 74 of variable position is the scanning arm.

As before, both trains of daughter paths leave the interferometer along a common path 78 and are focused onto a photodiode by use of a focusing assembly 82. The focusing assembly 82 is an xyz positioner with a small single lens and focuses light down onto the junction area of the diode 80. The two trains of daughter pulses are then combined and a mixing signal generated by the GaAsP photodiode 80 used in unbiased photovoltaic mode.

When measuring very short pulse durations such as 30 fs or less, pulse broadening occurs as the daughter pulses travel through the optical material covering the active semiconductor material of the photodiode. Therefore a diode with a large amount of optical material over it will distort the pulse unnecessarily, therefore the thickness of the window material over the diode is reduced to less than 0.5 mm or is removed altogether. The window material of many photodiode packages can be removed to avoid pulse broadening for the same reason. Pulse-broadening resulting from transit through the beamsplitter can be avoided by minimising its thickness and pulse-broadening introduced by the lens can be avoided by substitution of a reflective focusing optic such as a concave, spherical or parabolic mirror.

The loudspeaker 76 on which the mirror 74 is mounted is used to vary the arm length which the mirror 74 effectively provides. Thus when the loudspeaker is supplied with a drive signal in the form of a sine wave of the order of 10 Hz, the changing amplitude of the sine wave changes the position of the loudspeaker cone 76. This causes axial movement of the mirror 74 which is positioned on the cone, scanning the mirror over typically a few tenths of a millimeter. In such a way a path delay is introduced between the two trains of daughter pulses and by measuring the resultant output from the diode 80, a fringe-resolved interferogram is obtained.

The signal from the diode 80 can be seen in real time by triggering an oscilloscope with the speaker drive signal, therefore effectively reading the output voltage from the diode as a function of time, or the displacement of the mirror from the loudspeaker.

Thus an unbiased photodiode or light-emitting diode (LED) used as an unbiased photodiode exhibits a nonlinear power dependent response to optical radiation that can be used for sensitive detection and characterisation of mode-locked femtosecond and picosecond laser pulses. This has an application in the construction of inexpensive, robust, and compact autocorrelators. The diode means is a direct replacement for the nonlinear crystal and photomultiplier tube combination as used in prior art autocorrelators, and by use of a diode means clear real-time intensity autocorrelations are produced with only 2 mW or less incident power. Autocorrelation of pulses with average powers of less than 1 mW is possible using a simple amplifier circuit.

What is claimed is:

1. An autocorrelator of ultrashort electromagnetic pulses, comprising:

an interferometer for receiving a parent electromagnetic pulse from an energy source;

an output means coupled to the interferometer;

and diode means in communication with the output means;

wherein said interferometer derives two daughter pulses from said parent electromagnetic pulse, said output means passes said two daughter pulses to said diode means and said diode means detects the daughter pulses and alters the frequency thereof, so as to produce an electrical output signal which has a quadratic dependence on the power associated with the parent electromagnetic pulse.

2. An autocorrelator in accordance with claim 1, wherein said diode means doubles the frequency of said daughter pulses.

3. An autocorrelator according to claim 1, wherein the temporal duration of the parent electromagnetic pulses and the daughter pulses ranges from 10 picoseconds to 5 femtoseconds.

4. An autocorrelator according to claim 1, wherein the temporal duration of the parent electromagnetic pulses and the daughter electromagnetic pulses ranges from one picosecond to 5 femtoseconds.

5. An autocorrelator according to claim 1, wherein the temporal duration of the parent electromagnetic pulses and the daughter electromagnetic pulses ranges from 100 femtoseconds to 10 femtoseconds.

6. An autocorrelator according to claim 1, wherein said diode means is a semiconductor device with the semiconductor material comprising GaAsP, or AlGaAs, or InGaAs, or Ge, or GaAs.

7. An autocorrelator according to claim 1, wherein said interferometer is a Michelson interferometer.

8. An autocorrelator according to claim 1, wherein the interferometer is a Wollaston prism interferometer.

9. An autocorrelator according to claim 1, further comprising:

a focusing element provided between said output means and said diode means, so that said daughter pulses from said output means are focused onto a defined area of said diode means.

10. A method of second-harmonic generation autocorrelation for ultrashort electroshort pulses comprising:

receiving a parent electromagnetic pulse;

deriving two daughter pulses from said parent electromagnetic pulse by use of an interferometer;

passing said daughter pulses to a diode means with an energy gap of $E_g$;

detecting in said diode means daughter pulses of photon energy less than $E_g$ but greater than $E_g/2$; and producing an output electrical signal from said diode means, said output electrical signal depending quadratically on the incident power associated with said parent electromagnetic pulse.

* * * * *